(12) United States Patent
Shimizu

(10) Patent No.: US 7,860,367 B2
(45) Date of Patent: Dec. 28, 2010

(54) REPRODUCING APPARATUS AND REPRODUCING METHOD

(75) Inventor: Yoshinori Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 11/141,802

(22) Filed: May 31, 2005

(65) Prior Publication Data

US 2005/0232590 A1    Oct. 20, 2005

Related U.S. Application Data

(63) Continuation of application No. 09/575,858, filed on May 19, 2000, now abandoned.

(51) Int. Cl.
*H04N 5/91* (2006.01)
(52) U.S. Cl. .............. 386/46; 386/45; 386/95; 386/96; 386/125
(58) Field of Classification Search .......... 386/95, 386/96, 125, 126, 70, 45, 46; 369/48; 358/401, 358/403
See application file for complete search history.

(56) References Cited

U.S. PATENT DOCUMENTS

| 5,418,764 | A | * | 5/1995 | Roth et al. ............ 369/30.04 |
| 5,546,137 | A | | 8/1996 | Takeuchi |
| 5,633,726 | A | * | 5/1997 | Timmermans ............ 386/70 |
| 5,953,008 | A | * | 9/1999 | Hagiuda .................. 345/630 |
| 6,011,897 | A | * | 1/2000 | Koyama et al. ............ 386/95 |
| 6,062,868 | A | * | 5/2000 | Toriumi .................. 434/307 A |
| 6,317,141 | B1 | * | 11/2001 | Pavley et al. ............ 715/732 |
| 6,345,256 | B1 | * | 2/2002 | Milsted et al. ............ 705/64 |
| 6,356,971 | B1 | * | 3/2002 | Katz et al. .............. 710/301 |
| 6,876,612 | B2 | * | 4/2005 | Yoneyama et al. ...... 369/47.55 |
| 7,248,786 | B2 | * | 7/2007 | Kato et al. ............... 386/95 |
| 7,295,767 | B2 | * | 11/2007 | Takahashi et al. ........ 386/117 |
| 7,373,650 | B1 | * | 5/2008 | Rodriguez et al. ........ 725/41 |
| 2006/0064716 | A1 | * | 3/2006 | Sull et al. .................. 725/37 |

* cited by examiner

*Primary Examiner*—Jamie J Atala
(74) *Attorney, Agent, or Firm*—Frommer Lawrence & Haug LLP; William S. Frommer; Thomas F. Presson (57) ABSTRACT

A method for displaying index data corresponding to contents data recorded on a recording medium, the method comprising: retrieving the index data from the recording medium: displaying the index data retrieved from the recording medium and a plurality of media related information items of different media formats, the index data displayed in an index data region and the plurality of media related information items displayed in a media type selection region, wherein when a media related information item from the plurality of media related information item is selected, index data corresponding to the selected media related information item is displayed.

16 Claims, 10 Drawing Sheets

REPRODUCING APPARATUS AND REPRODUCING METHOD

CROSS-REFERENCE TO RELATED APPLICATIONS

This application is a continuation of U.S. patent application Ser. No. 09/575,858 entitled "REPRODUCING APPARATUS AND REPRODUCING METHOD", filed May 19, 2000 now abandoned. Benefit of priority of the filing date of May 19, 2000 is hereby claimed, and the disclosure of the patent application is hereby incorporated by reference.

BACKGROUND

1. Field of the Invention

The present invention relates to a reproducing apparatus and a reproducing method for use with for example a DVD (Digital Versatile Disc or Digital Video Disc)

2. Description of the Related Art

A particular type of a DVD video disc that is conventionally available has an area for a jacket picture as well as an area for video contents data. On the other hand, with a CD (Compact Disc: registered trademark) and a CD extra disc, audio data and video data can be recorded thereon. Thus, a reproducing apparatus for a DVD video disc, a CD video disc, and/or a CD extra disc can display one still picture recorded on a disc on a displaying unit.

In addition, a disc changer having many disc slots is known. With the disc changer, the user can select one of discs accommodated in the disc slots and causes the disc changer to reproduce contents data from the selected disc. With the disc changer, a disc is selected by directly designating a slot number corresponding to a desired disc. Alternatively, with a GUI (Graphical User Interface) that shows a list of text information correlated with discs, a disc is selected by designating desired text information.

However, when the user directly designates his or her desired disc, since the amount of information provided to the user is insufficient, it is difficult for him or her to select his or her desired disc from many discs.

On the other hand, when the user can manage the discs accommodated in the disc changer and search his or her desired disc therefrom using picture information correlated with the discs, it is expected to improve the visibility and operability of the disc changer.

To accomplish the GUI, it is necessary to simultaneously display a plurality of index still pictures such as jacket pictures on the screen of the displaying unit. In this case, it is necessary to allow the user to perform operations for the displayed still pictures (for example, a moving operation, a deleting operation, and a scrolling operation) without a deterioration of the picture quality.

When picture contents are reproduced from optical discs having different formats, their picture frame sizes are different. Even if the types of optical discs are the same, their picture frame sizes vary corresponding to television systems.

When a plurality of jacket pictures of different picture frame sizes are simultaneously displayed and operated, the controlling process becomes complicated.

SUMMARY

Therefore, an object of the present invention is to provide a reproducing apparatus and a reproducing method that allow a plurality of index pictures to be simultaneously displayed, the displayed index pictures to be operated without a deterioration of the picture quality, index pictures of different sizes to be simultaneously displayed, and the operations for displaying index pictures to be simplified.

A first aspect of the present invention is are producing apparatus for receiving contents data and index pictures corresponding thereto from a record medium or a transmission medium, the picture frame sizes of the index pictures being smaller than the picture frame size of the contents data, displaying the index pictures on displaying means, and selecting contents data with the displayed index pictures, the reproducing apparatus comprising a first storing means for storing first index picture data that is received, a picture processing means for processing the first index picture data that is read from the first storing means, and a second storing means for storing second index picture data that is formed by the picture processing means and for outputting picture data to be displayed, wherein at least one index picture is arranged in one direction and displayed corresponding to the picture data to be displayed.

A second aspect of the present invention is a reproducing method for receiving contents data and index pictures corresponding thereto from a record medium or a transmission medium, the picture frame sizes of the index pictures being smaller than the picture frame size of the contents data, displaying the index pictures on displaying means, and selecting contents data with the displayed index pictures, the reproducing method comprising the steps of storing first index picture data that is received to first storing means, processing the first index picture data that is read from the first storing means with picture processing means, and storing second index picture data that is formed by the picture processing means in second storing means and for outputting picture data to be displayed from the second storing means, wherein at least one index picture is arranged in one direction and displayed corresponding to the picture data to be displayed.

These and other objects, features and advantages of the present invention will become more apparent in light of the following detailed description of a best mode embodiment thereof, as illustrated in the accompanying drawings.

DETAILED DESCRIPTION

Figure 1:
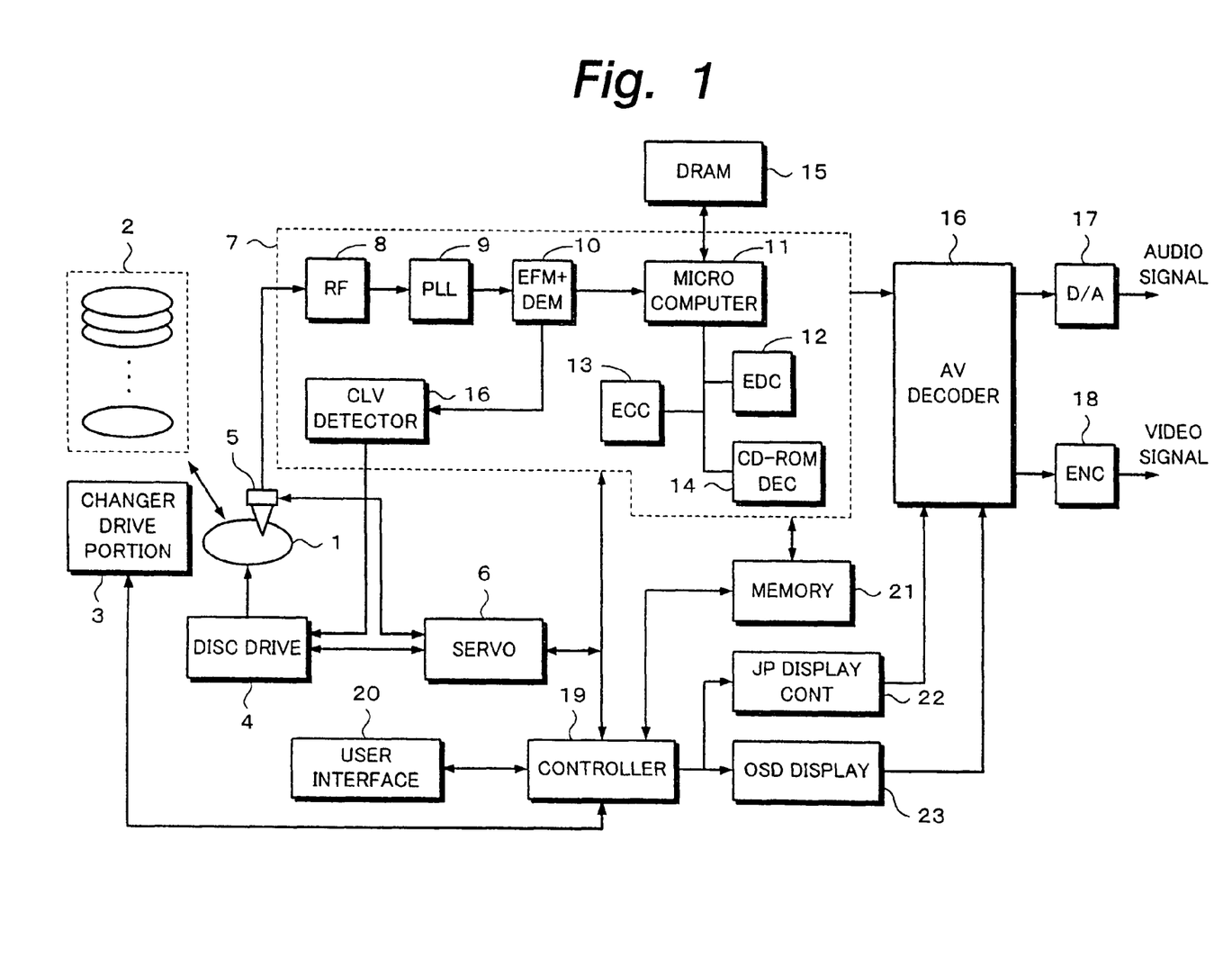
FIG. 1 is a block diagram showing the overall structure of a system according to an embodiment of the present invention.

Next, with reference to the accompanying drawings, an embodiment of the present invention will be described. FIG. 1 shows an outline of the overall structure of a disc changer according to the embodiment of the present invention. In FIG. 1, reference numeral 1 is a disc. The disc 1 is an optical disc such as a DVD video disc, a CD, or a video CD.

Reference numeral 2 is a disc accommodating portion. The disc accommodating portion 2 has many numbered-slots that accommodate discs (for example, DVDs) one by one. The disc accommodating portion 2 is controlled by a changer driving portion 3. One disc (disc 1) with a designated slot number is loaded from the disc accommodating portion 2 to a disc driving portion 4 in such a manner that the disc 1 is rotated by the disc driving portion 4.

Information recorded on the disc 1 is optically read by an optical head 5. Pits corresponding to record information are formed on spiral tracks of the disc 1. The optical head 5 radiates a laser beam to the disc 1. The reflected light is detected by an optical detector. Thus, the information recorded on the disc 1 is read. When the disc 1 is a DVD video disc, video information that has been compressed corresponding to variable bit rate MPEG 2 (Moving Picture Experts Group Phase 2) format, audio information that has been compressed corresponding to linear PCM or AC-3 compression data format, and auxiliary information such as a sub picture (sub title information) or control information are recorded.

The driving portion 4 has a spindle motor and a feed motor. The spindle motor rotates the disc at CLV (Constant Linear Velocity). The feed motor radially feeds the disc. A servo portion 6 controls the spindle motor and the feed motor of the driving portion 4. In addition, the servo portion 6 controls the tracking operation and the focusing operation of the optical head 5.

Information (reproduction signal) that is read from the disc 1 by the optical head 5 is supplied to a reproduction signal processing portion 7 that is a circuit block surrounded by dotted lines. The reproduction signal is supplied to an RF portion 8. The RF portion 8 has a pre-amplifier, an equalizer, and so forth. An output signal of the RF portion 8 is supplied to a PLL (Phase Locked Loop) 9. The PLL 9 performs a synchronous detecting process and an A/D converting process for the signal received from the RF portion 8. An output signal of the PLL 9 is supplied to an EFM+ (plus) demodulating portion 10. The EFM+ plus demodulating portion 10 demodulates a signal that has been modulated corresponding to EFM+ system. The EFM+ system is a digital modulating system of which data of eight bits is converted into a code of 16 bits corresponding to a predetermined rule.

The EFM+ demodulating portion 10 is connected to a CLV detector 16. The CLV detector 16 extracts a signal necessary for performing a CLV controlling process. The extracted signal is supplied to a disc driving portion 4. An error detecting process, an error correcting process, and a CD-ROM decoding process are performed for the demodulated data by a microcomputer 11, an error detecting portion 12, an error correcting portion 13, and a CD-ROM decoder 14. The error detecting portion 12, the error correcting portion 13, and the CD-ROM decoder 14 are controlled by the microcomputer 11. The microcomputer 11 is connected to a DRAM 15 as a large storage memory. In this example, the disc changer can reproduce contents data from a CD, a CD extra disc, a CD-ROM, and so forth as well as a DVD video disc. Thus, the disc changer according to the embodiment has a CD-ROM decoder 14.

The reproduction data that is output from the reproduction signal processing portion 7 is supplied to an AV (video and audio) decoder 16. As will be described later, the AV decoder 16 decodes the reproduction data and generates a digital audio signal. In addition, the AV decoder 16 decodes the reproduction data and generates digital video data. The digital audio data is supplied to a D/A converter 17. The D/A converter 17 converts the digital audio data into an analog audio signal. The analog audio signal is reproduced by a speaker (not shown) through an audio amplifier (not shown). The digital video data is supplied to an encoder 18. The encoder 18 converts the digital video data into for example an analog NTSC video signal. The analog video signal is supplied to and reproduced by a monitor (not shown).

Reference numeral 19 is a controller that controls the overall disc reproducing system. The controller 19 controls the changer driving portion 3, the servo portion 6, and the reproduction signal processing portion 7. The controller 19 is connected to a user interface 20. In reality, the user interface 20 is composed of a remote controller, a keyboard, and a mouse.

Reference numeral 21 is a storing portion. The storing portion 21 is controlled by the controller 19. The storing portion 21 is a non-volatile memory. The storing portion 21 stores a still picture that represents the contents of each disc accommodated in the disc accommodating portion 2. For example, a picture of a jacket of each DVD video disc is stored in the storing portion 21 (this picture is referred to as jacket picture). One type of DVD video discs has a dedicated area for the jacket picture along with a video contents record area for a movie or the like. The jacket picture data is written from the reproduction signal processing portion 7 to the storing portion 21 under the control of the controller 19. The jacket picture data that is read from the storing portion 21 is supplied to the AV decoder 16 through the reproduction signal processing portion 7.

In addition, the controller 19 controls a jacket picture (JP) displaying controller 22 so as to control a displaying process for the jacket picture. The controller 19 controls an OSD (On Screen Display) displaying portion 23 so as to generate display data that is displayed on the monitor. The AV decoder 16 superimposes the display data on the reproduction video data. As will be described later, a GUI (Graphical User Interface) is accomplished by the user interface 20 and display data displayed on the monitor.

Figure 2:
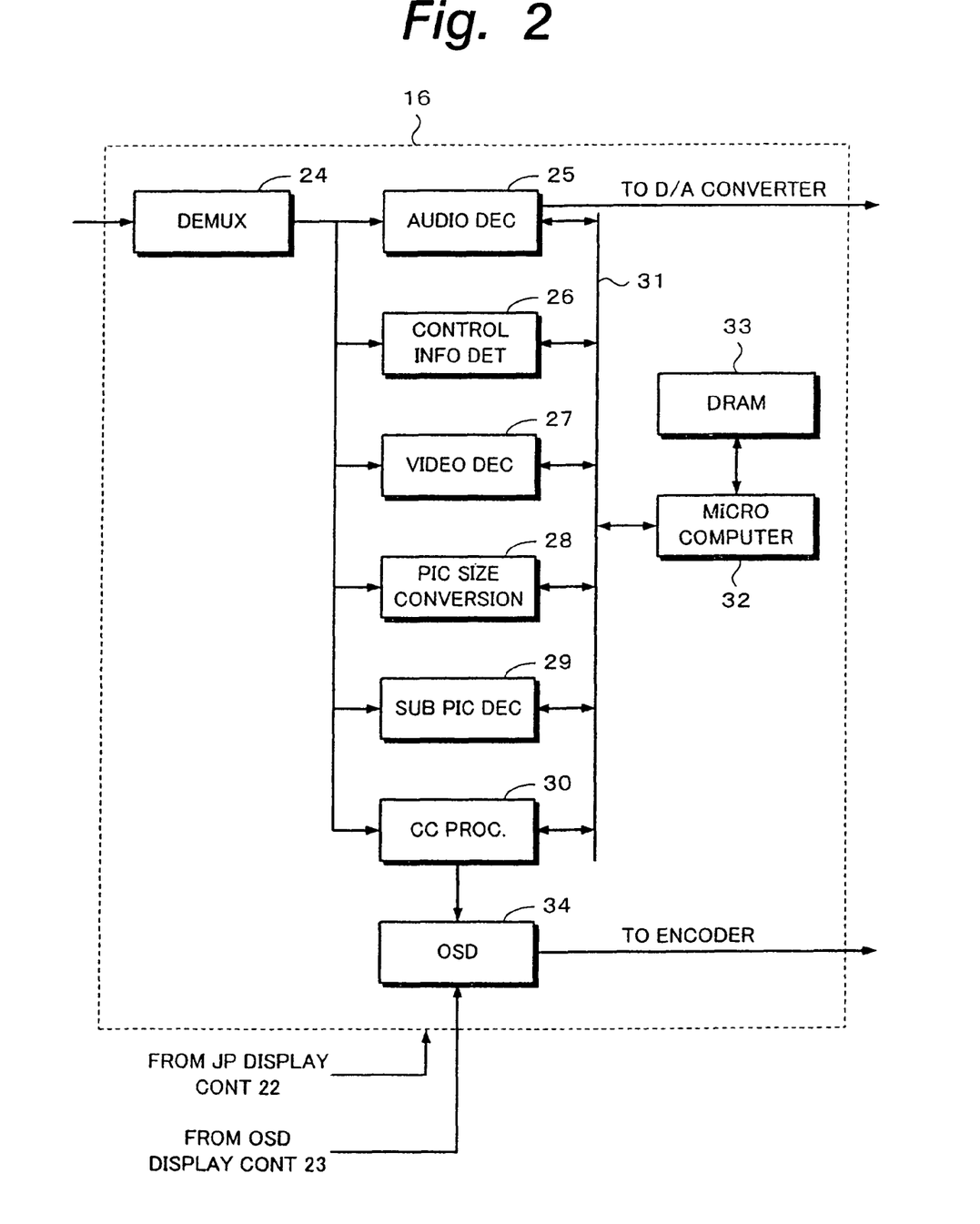
FIG. 2 is a block diagram showing an example of the structure of an AV decoder shown in FIG. 1.

FIG. 2 shows an example of the structure of the AV decoder 16 in the case that the disc 1 is a DVD video disc. The reproduction digital data that is output from the reproduction signal processing portion 7 is supplied to a demultiplexer 24. The demultiplexer 24 demultiplexes the reproduction digital data into a video stream, an audio stream, a sub picture stream, a jacket picture stream, and so forth. The audio stream is supplied to an audio decoder 16. The audio decoder 16 decodes the audio stream. When the disc 1 is a DVD, the audio decoder 25 decodes the audio stream corresponding to AC3 method. The digital audio data that is output from the audio decoder 25 is supplied to the D/A converter 17 (see FIG. 1).

A control information detecting portion 26 detects control information necessary for processing the video stream, the sub picture stream, and so forth. A video decoder 27 decodes the video stream that has been encoded corresponding to the MPEG 2 method. As with the video stream, the video decoder 27 decodes the jacket stream. A picture size converting portion 28 converts the aspect ratio of the video stream. For example, the picture size converting portion 28 converts a picture having an aspect ratio of 16:9 into a picture having an aspect ratio of 4:3. A sub picture decoder 29 decodes the sub picture stream and outputs sub title information. A closed caption processing portion 30 processes closed caption information contained in the video stream.

The above-described processing portion that processes pictures is connected to a microcomputer 32 through a CPU bus 31. The microcomputer 32 controls a process for a picture using a DRAM that is a buffer memory. The digital video data decoded by the video decoder 27, the sub picture decoded by the sub picture decoder 29, and the closed caption that is output from the closed caption processing portion 30 are supplied to an OSD portion 34. The OSD displaying portion 23 (see FIG. 1) supplies display information to the OSD portion 34.

Figure 3:
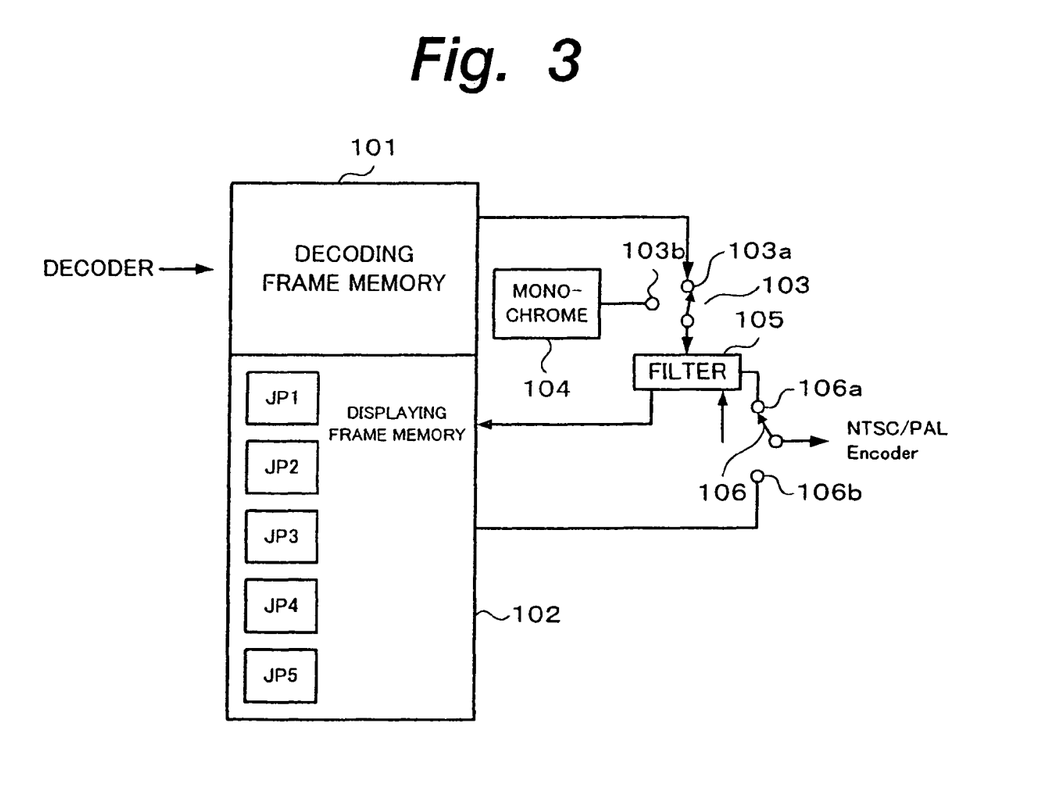
FIG. 3 is a block diagram showing the structure of an embodiment of the present invention.

FIG. 3 shows the structure of a picture processing portion according to the embodiment of the present invention. In FIG. 3, reference numeral 101 is a decoding frame memory. Reference numeral 102 is a displaying frame memory. Normally, picture data that is read from a disc such as a DVD is decoded by a video decoder 127. The decoded data is written to the frame memory 101. Hereinafter, an index picture (still picture) related to contents data is referred to as jacket picture.

Data that is read from the decoding frame memory 101 is supplied to a filing block 105 through one input terminal 103a of a selector 103. Mono-chrome data (for example, black data) is supplied from a mono-chrome data source 104 to another input terminal 103b of the selector 103.

The filtering block 105 converts the format of a component signal from for example (4:2:0) to (4:2:2). In addition, the filtering block 105 converts the size of the picture to another size (namely, reduces or enlarges the picture). These processes performed by the filtering block 105 are selected correspondingly to an external control signal.

An output signal of the filtering block 105 is written to the displaying frame memory 102. The output signal of the filtering block 105 is also supplied to an NTSC or PAL encoder (not shown) through an input terminal 106a of a selector 106. The NTSC or PAL encoder encodes the component signal into a composite color video signal. An output signal of the encoder is supplied to a D/A converter. The D/A converter converts the input signal as a digital signal into an analog signal. The analog signal is supplied to a monitor that is for example a CRT displaying unit or an LCD displaying unit. Thus, a picture corresponding to the analog signal is displayed on the monitor. Data that is read from the displaying frame memory 102 is output to the encoder through another input terminal 106b of the selector 106. The selectors 103 and 106 are controlled corresponding to a control signal received from a controller 19.

The displaying frame memory 102 stores jacket picture data of at least one disc accommodated in the disc changer.

The displaying frame memory 102 stores jacket picture data of for example up to five discs. A jacket picture is recorded on a disc such as a DVD video disc. As a jacket picture, a picture of a top scene or a middle scene of video contents data recorded on a DVD video disc may be used. Alternatively, still picture data corresponding to genres designated by the user through the GUI of the disc changer may be used. In this case, a plurality of still pictures corresponding to genres (such as action, comedy, drama, and so forth) are prepared.

Figure 4:
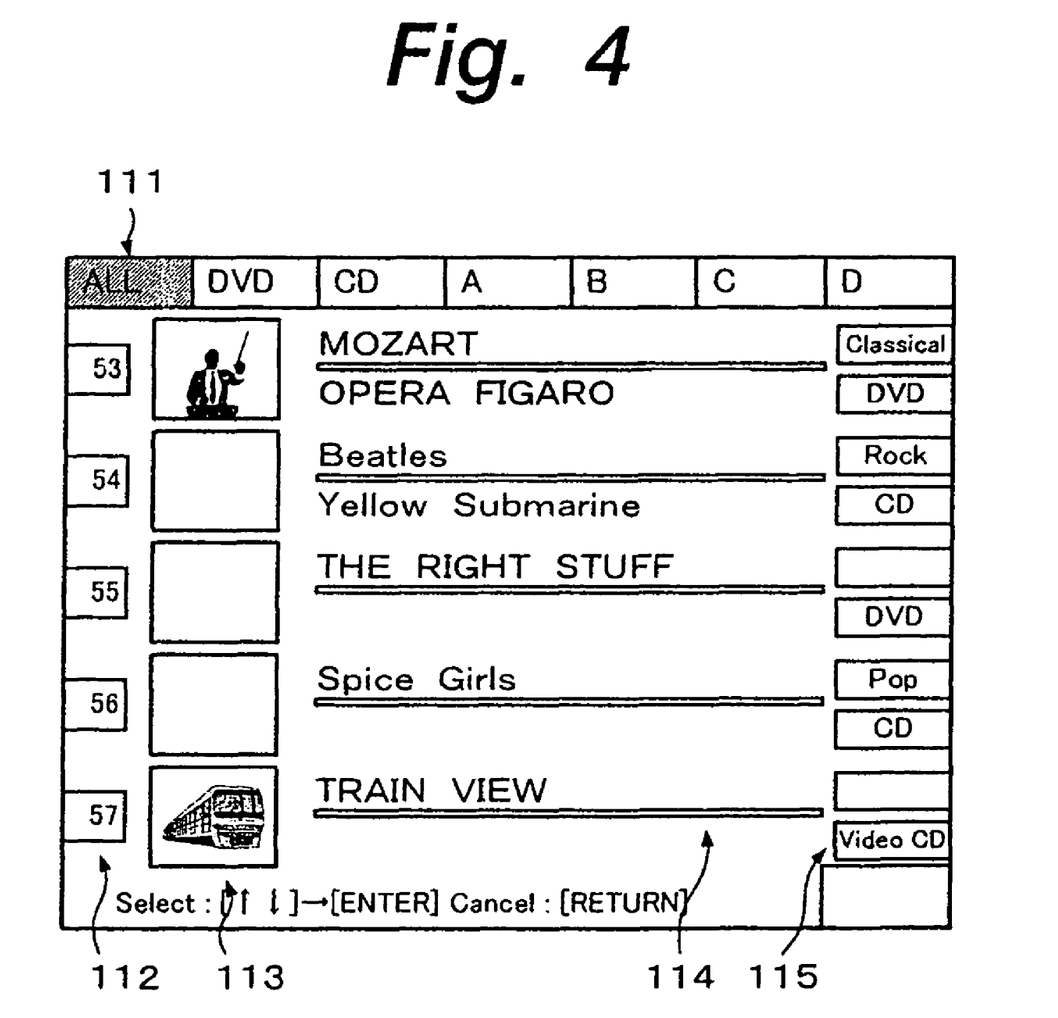
FIG. 4 is a schematic diagram showing an example of a GUI screen of a disc changer according to the present invention.

For easy understanding of the present invention, an example of a real GUI screen will be shown in FIG. 4. Referring to FIG. 4, the GUI screen has the following areas that are framed.

A folder displaying area 111 is placed as a bar at an upper portion of the GUI screen. In the example shown in FIG. 4, an "ALL" folder has been selected. The "ALL" folder is highlighted in such a manner that the color and brightness of the "ALL" folder are different from those of the other folders.

A displaying area 112 has slot numbers arranged in the vertical direction. In the example shown in FIG. 4, information of five slot numbers can be simultaneously displayed. With a scrolling operation, slot numbers can be scrolled.

A jacket picture displaying area 113, a text displaying area 114, and a genre/disc type information displaying area 115 are displayed corresponding to slot numbers. The genre/disc type information displaying area 115 is placed at a right vertical area. The genre/disc type information displaying area 115 is composed of a genre displaying area (as an upper area) and a disc type displaying area (as a lower area). In the example shown in FIG. 4, information corresponding to the slot number "53" is highlighted.

For example, in the highlighted slot "53", a DVD having related information of (genre: classic, type: DVD, text: MOZART, OPERA FIGARO) is accommodated. A jacket picture recorded on the DVD is displayed. On the other hand, in the slot number "57", a video CD having related information of (genre: none, type: video CD, text: TRAIN VIEW) is accommodated. A jacket picture recorded on the video CD is displayed.

As shown in FIG. 4, since a plurality of jacket pictures that represent the contents of the individual discs are simultaneously displayed, the user can visually know what disc is accommodated in what slot. When the user designates his or her desired jacket picture, he or she can cause the apparatus to reproduce contents data of a disc corresponding to the designated jacket picture.

The reproduced picture is displayed as an OSD (On Screen Display) on a monitor or a displaying unit (not shown in FIG. 3) of the disc changer.

To allow a plurality of jacket pictures to be simultaneously displayed on one screen as shown in FIG. 4, with the structure shown in FIG. 3, the following process is performed. In this example, the jacket pictures are not dispersed two-dimensionally on the entire screen, but arranged in the vertical direction thereof. Thus, as was described above, text information, genre information, and disc type information can be displayed for each slot number. Consequently, even if a jacket picture is not displayed, the user can easily manage a plurality discs with text information and so forth displayed on the GUI screen.

First of all, mono-chrome data (for example, black data) is written from the mono-chrome data source 104 to all the displaying frame memory 104 through the selector 103. Alternatively, predetermined mono-chrome data may be written from the filtering block 105 to the displaying frame memory 102.

For example, picture data (jacket picture data) that has been MPEG decoded is temporarily written to the decoding frame memory 101. The picture data is supplied from the frame memory 101 to the filtering block 105 through the selector 103. The filtering block 105 converts the format of a component signal from for example (4:2:0) to (4:2:2). The resultant signal is written to the displaying frame memory 102. The data that is read from the displaying frame memory 102 is supplied to the NTSC or PAL encoder through the selector 106. The encoder supplies a television signal to the monitor. The monitor displays a picture corresponding to the television signal.

When data is temporarily written to the displaying frame memory 102, until new picture is decoded, it is not necessary to write data from the decoding frame memory 101 to the displaying frame memory 102. The data stored in the displaying frame memory 102 is repeatedly read. The data that is read from the displaying frame memory 102 is supplied to the NTSC or PAL encoder through the selector 106.

To immediately add and display a new jacket picture to one screen without a deterioration of the picture quality, in the structure shown in FIG. 3, the following process is performed.

In the case that data is written from the decoding frame memory 101 to the displaying frame memory 102, while the first field of a jacket picture stored in the frame memory 102 is being displayed, data of the second field is written from the frame memory 101 to the frame memory 102. Thus, a new jacket picture can be added and displayed without a deterioration of the picture quality.

To allow any number of jacket pictures to be removed from a plurality of jacket pictures that are simultaneously displayed on the GUI screen without a deterioration of the picture quality, the following process is performed.

Figure 5:
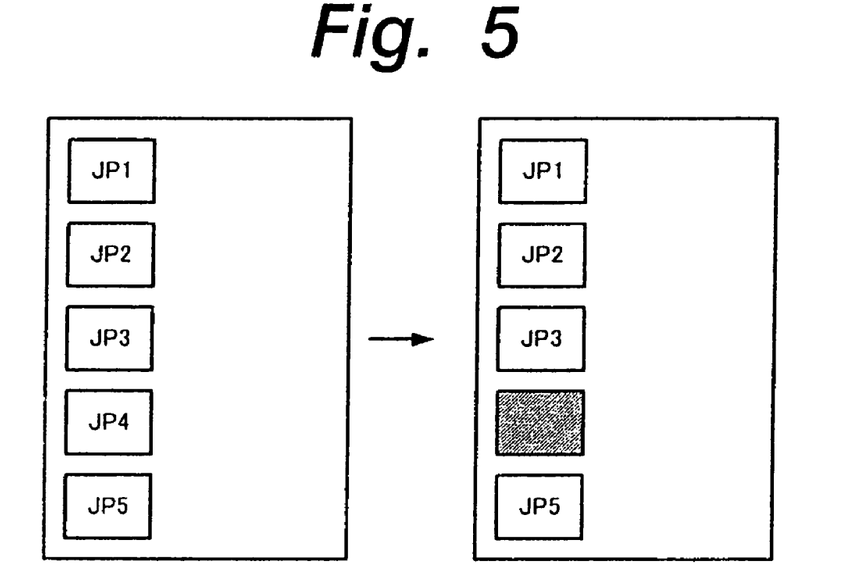
FIG. 5 is a schematic diagram for explaining an example of a process for causing one still picture from a plurality of still pictures being displayed.

In this example, a fourth jacket picture JP4 is removed from for example five jacket pictures (JP1 to JP5) simultaneously displayed as shown in FIG. 5. In this process, mono-chrome data is overwritten to an area for the jacket picture JP4 of the displaying frame memory 102.

In the case that mono-chrome data is overwritten, data of one of the first field and the second field that is not at the displaying period is overwritten. Thus, any jacket picture can be removed from a plurality of jacket pictures without a deterioration of the picture quality. The process for removing a jacket picture is required in the case that a disc is removed from the disc changer.

To convert jacket pictures of different picture frame sizes into jacket pictures of a common picture frame size and simultaneously display them on one screen, the following process is performed.

Figure 6A:
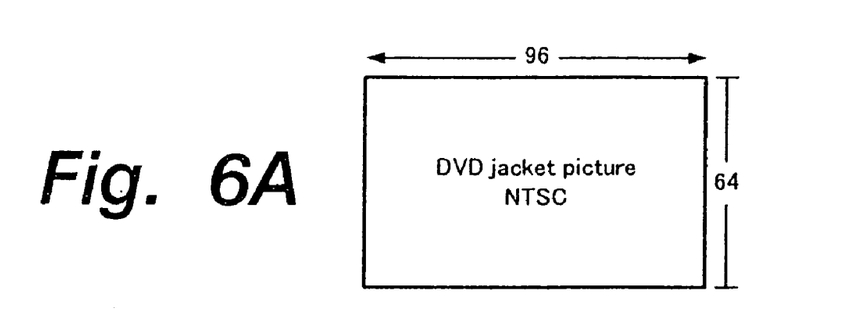
FIGS. 6 and 6B are schematic diagrams showing a process for converting a still picture of a different picture frame size into a still picture of a common picture frame size according to the present invention.
Figure 7A:
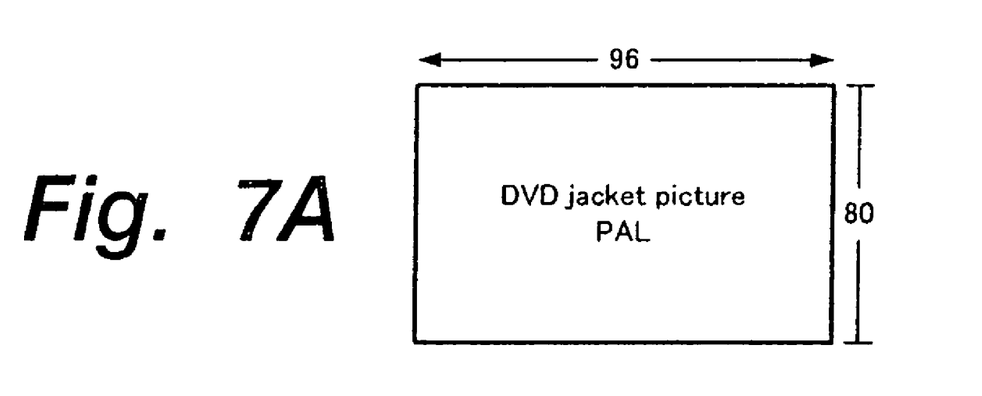
FIGS. 7A and 7B are schematic diagrams for explaining a process for converting a still picture of a different picture frame size into a still picture of a common picture frame size according to the present invention.

When data is written to the displaying frame memory 102, the filtering block 105 enlarges or reduce pictures stored in the decoding frame memory 101 so as to convert jacket pictures of different picture frame sizes into jacket pictures of same picture frame size. There are three types of DVD jacket pictures. The size of a small jacket picture corresponding to the NTSC system is defined as (96 [wide]×64 [high]) as shown in FIG. 6A. The size of a small jacket picture corresponding to the PAL system is defined as (96 [wide]×80 [high]) as shown in FIG. 7A. These sizes allow for example five jacket pictures to be arranged in the vertically direction on one screen.

The sizes of index pictures vary corresponding to types of discs. For example, the size of a small jacket picture of a CD extra disc corresponding to the NTSC system is defined as (176 [wide]×112 [high]). On the other hand, the size of a small jacket picture of a CD extra disc corresponding to the PAL system is defined as (176 [wide]×144 [high]).

A disc player such as a disc changer can reproduce contents data from different types of discs. Thus, when the sizes of index pictures are different, they deteriorate the visual uniformity. In addition, the process for index pictures will become complicated.

Figure 6B:
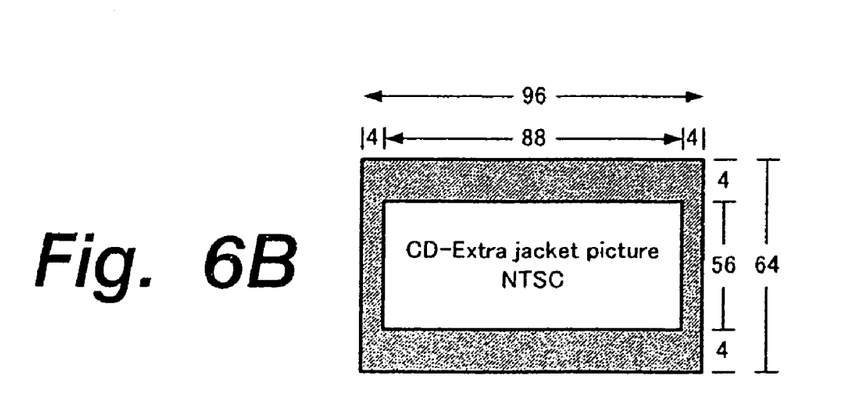
Figure 7B:
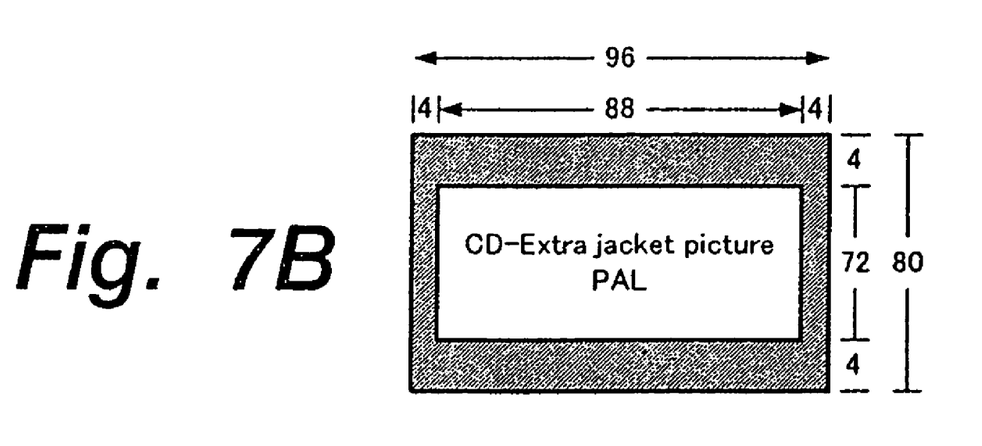

To solve such a problem, the filtering block 105 reduces a jacket picture of a CD extra disc in each of the vertical and horizontal directions by one half. Thus, in the case of the NTSC system, a jacket picture is reduced to (88 [wide]×56 [high]). In contrast, in the case of the PAL system, a jacket picture is reduced to (88 [wide]×72 [high]). As shown in FIG. 6B, in the case of the NTSC system, a mono-chrome (for example, black) frame of four lines is added to each of the upper edge and the lower edge of the jacket picture. In addition, a mono-chrome frame of four pixels is added to each of the left edge and the right edge of the jacket picture. Thus, a jacket picture of (96 [wide]×88 [high]) can be generated. As shown in FIG. 7B, likewise, in the case of the PAL system, with mono-chrome frames added, a jacket picture of (96 [wide]×80 [high]) can be generated. The mono-chrome frames are written from the mono-chrome data source 104 to predetermined areas of the displaying frame memory 102.

With such processes, regardless of the types of discs, picture frame sizes of jacket pictures can be uniformed with those of DVDs. In addition, in the examples of the above-described DVD and CD extra disc, the process for reducing the picture size in each of the vertical and horizontal direction by one half and adding frames to each of the upper, lower, left, and right edges are common in the NTSC system and the PAL system.

In the process shown in FIGS. 6A and 6B, the changer player corresponds to the NTSC system, whereas the monitor (displaying unit) corresponds to the NTSC system. On the other hand, in the process shown in FIGS. 7A and 7B, the changer player corresponds to the PAL system, whereas the monitor (displaying unit) corresponds to the PAL or NTSC system.

When the changer player and the monitor correspond to both the NTSC and PAL systems, the changer player can use both an NTSC disc and a PAL disc. Thus, the changer player may reproduce jacket pictures corresponding to both the NTSC and PAL systems. In this case, to uniform of jacket pictures of different sizes displayed on one screen, it is necessary to vary the enlarging/reducing operations of the filtering block 105 corresponding to the television systems. When jacket pictures are uniformed with the size corresponding to for example the NTSC system, jacket pictures corresponding to the PAL system are reduced by ⅚. On the other hand, when jacket pictures are uniformed with the size corresponding to the PAL system, jacket pictures corresponding to the NTSC system are reduced by ⅚.

Alternatively, when the process for adding mono-chrome frames of predetermined sizes shown in FIGS. 8A, 8B, 8C, and 8D is used, the picture frame sizes can be uniformed. FIGS. 8A, 8B, 8C, and 8D show an example of which jacket pictures are uniformed with a size of (96 [wide]×80 [high]) corresponding to the PAL system.

Figure 8A:
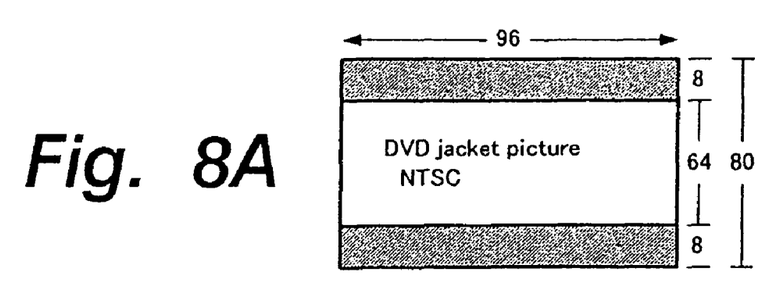
FIGS. 8A, 8B, 8C, and 8D are schematic diagrams for explaining a process for converting a still picture of a different picture frame size into a still picture of a common picture frame size.
Figure 8B:
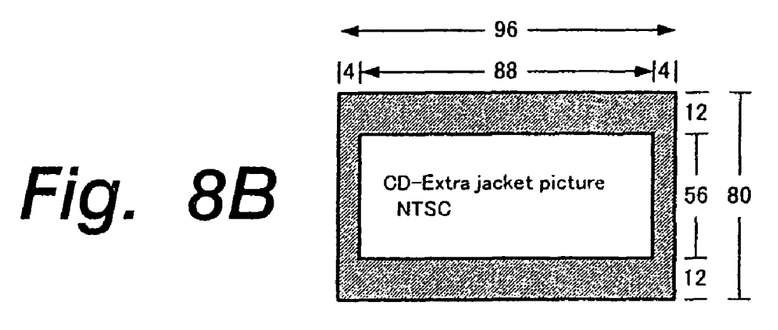

FIG. 8A shows the case that a jacket picture of a DVD corresponding to the NTSC system is displayed. When a mono-chrome frame of eight lines is added to each of the upper and lower edges of the jacket picture, a jacket picture with a size of (96 [wide]×80 [high]) is generated. FIG. 8B shows the case that a jacket picture of a CD extra disc corresponding to the NTSC system is displayed. When a mono-chrome frame of 12 lines is added to each of the upper and lower edges of the jacket picture and a mono-chrome frame of four pixels is added to each of the left and right edges thereof, a jacket picture with a size of (96 [wide]×80 [(high]) is generated.

Figure 8C:
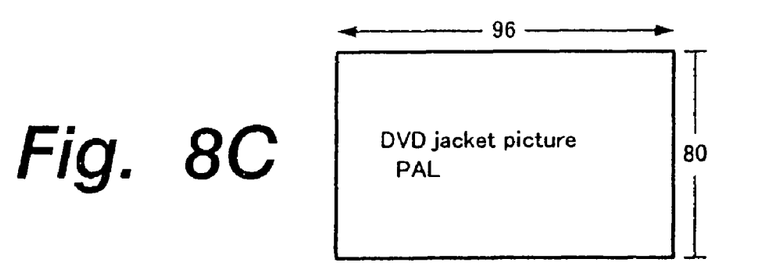
Figure 8D:
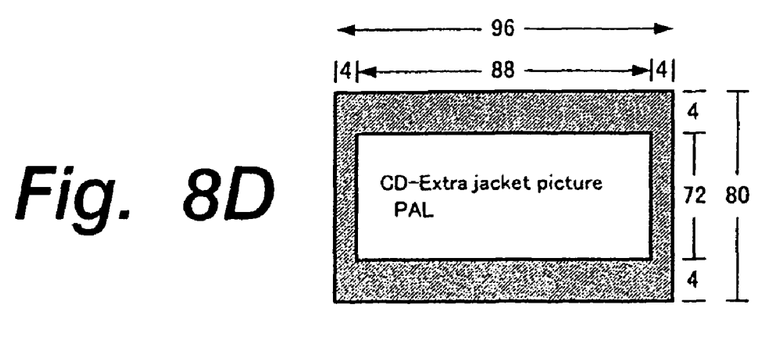

FIG. 8C shows the case that a jacket picture of a DVD corresponding to the PAL system is displayed. In this case, the size converting process is not required. FIG. 8D shows the case that a jacket picture of a CD extra disc corresponding to the PAL system is displayed. When a mono-chrome frame of four lines is added to each of the upper and lower edges of the jacket picture and a mono-chrome frame of four pixels is added to each of the left and right edges, a jacket picture with a size of (96 [wide]×80 [high]) is generated.

Next, with reference to FIGS. 9A and 9B, a process for immediately changing the displaying position of a jacket picture on one screen without a deterioration of the picture quality will be described.

Figure 9A:
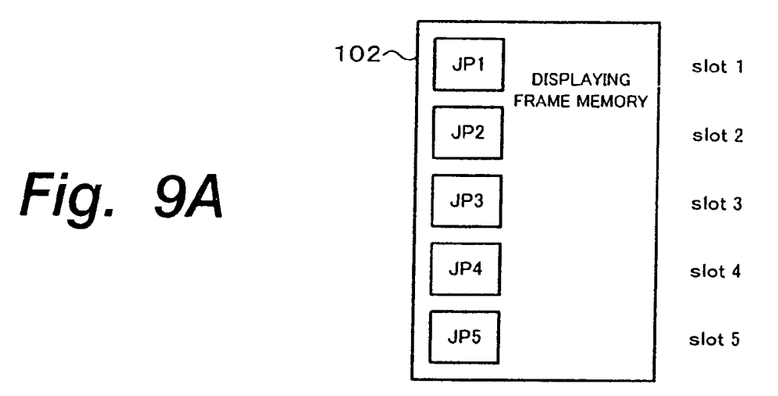
FIGS. 9A and 9B are schematic diagrams for explaining a process for changing a displaying position of a still picture.
Figure 9B:
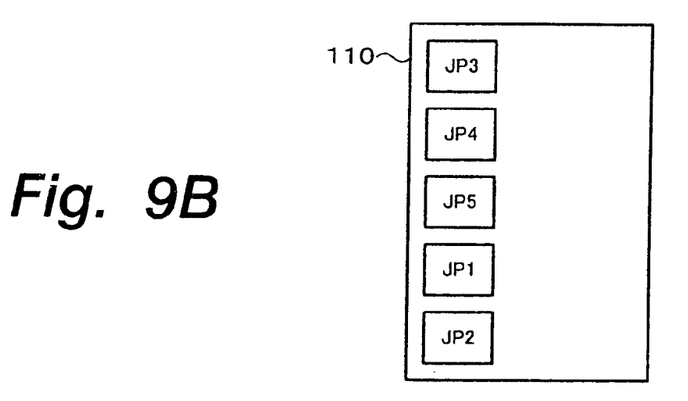

FIG. 9A shows the state that five jacket pictures JP1 to JP5 are stored in the displaying frame memory 101. When five jacket pictures are arranged in the vertical direction, the lines of one frame are divided into five areas that are denoted by slots 1, 2, 3, 4, and 5.

As with the five jacket pictures stored in the displaying frame memory 102, five jacket pictures can be displayed on the monitor. In this example, a process for displaying five pictures on the screen 110 of the monitor in the arrangement shown in FIG. 9B is performed. In this example, the slots 3, 4, 5, 1, and 2 are successively read from the displaying frame memory 102. In other words, when the data reading positions of the displaying frame memory 102 can be selected, the displaying positions of a plurality of jacket pictures can be immediately varied.

Figure 10A:
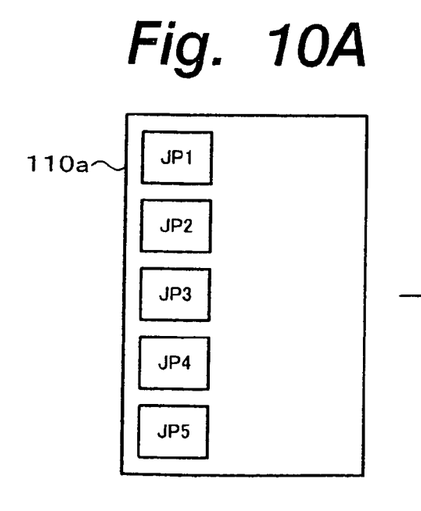
FIGS. 10A and 10B are schematic diagrams for explaining a process for moving a displayed jacket picture according to the present invention.
Figure 10B:
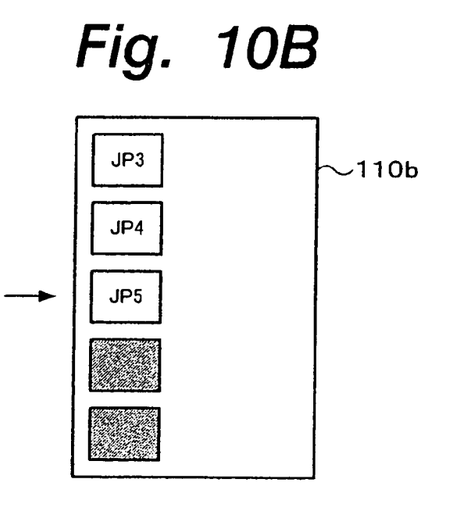

Next, a process for moving the displaying position of a jacket picture and causing it to disappear from the original position will be described. As shown in FIG. 9A, when five jacket pictures are stored in the displaying frame memory 102 as shown in FIG. 9A, a screen 110a (on which jacket pictures JP1 to JP5 are successively arranged in the vertical direction) is displayed as shown in FIG. 10A. Next, as was described above, when the reading positions of the frame memory 102 are controlled, the jacket pictures JP3, JP4, and JP5 can be successively arranged from the top of the screen. When a screen 110b (on which jacket pictures that have been moved disappear from the original positions) is displayed as shown in FIG. 10B, predetermined color data (for example, black data) is written to the areas of the jacket pictures JP1 and JP2 of the frame memory 102.

Figure 11:
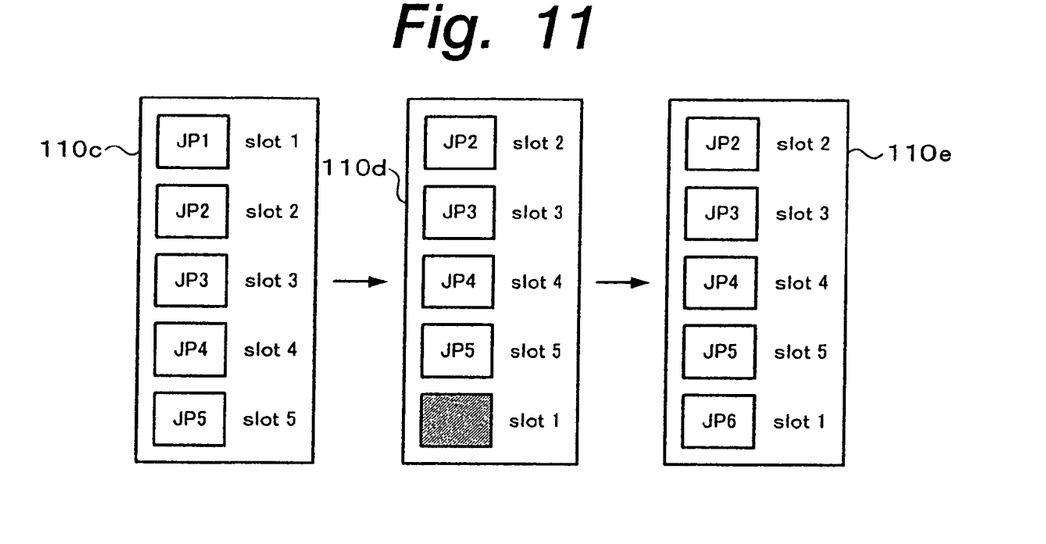
FIG. 11 is a schematic diagram for explaining a process for scrolling a displayed jacket picture.

Next, a process for changing a screen 110c that represents the jacket pictures JP1 to JP5 to a screen 110e that represents the jacket pictures JP2 to JP6 as shown in FIG. 11 will be described (this process is referred to as scrolling process).

When the reading sequence of the slots is controlled, a screen 110d shown in FIG. 11 is displayed. The screen 110d is the same as the screen 110a shown in FIG. 10A. After the screen 110d is displayed, a new jacket picture JP6 is decoded and written to the decoding frame memory 101. The filtering block 105 converts the (4:2:0) signal into (4:2:2) signal. When necessary, the size uniforming process is performed. Thereafter, the resultant jacket picture JP6 is written to the slot 1 of the displaying frame memory 102. Thus, a screen 110e is displayed.

In the case of the disc changer, a selected disc is represented by a highlighted portion on the screen. The user moves the highlighted portion so as to select his or her desired disc. When the highlighted portion is at the upper edge or the lower edge of the screen, if a moving request for the highlighted portion takes place, the above-described scrolling operation is required.

In the above example, the case of which the present invention is applied to a disc changer and jacket pictures of at least one disc are simultaneously displayed on one screen was described. However, it should be noted that the present invention can be applied to other than the disc changer. Next, several examples of the present invention will be described.

Figure 12:
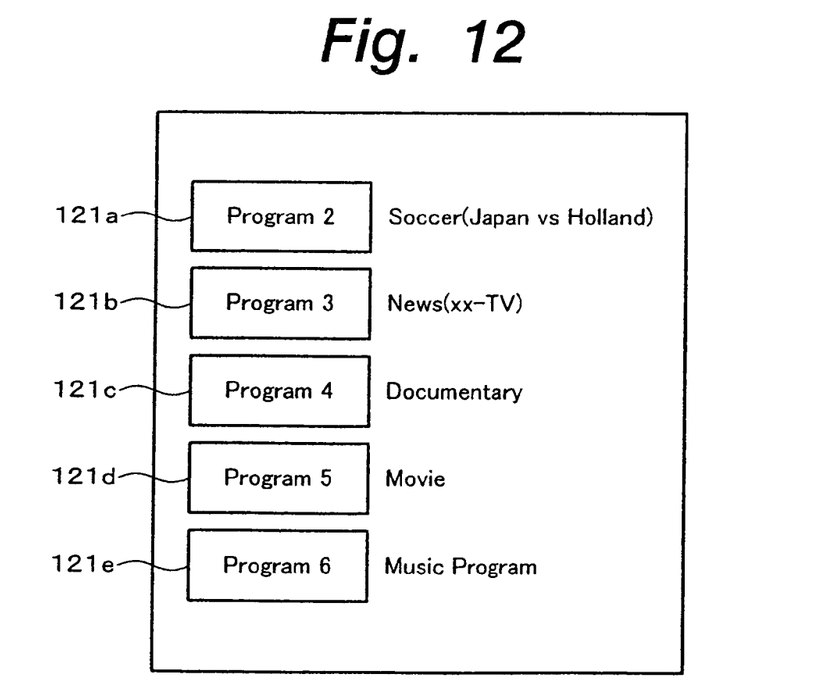
FIG. 12 is a schematic diagram showing a program selecting screen for selecting a program recorded in a video recording apparatus according to the present invention.

FIG. 12 shows an example of which the present invention is applied to a program selecting screen of a digital video recording and reproducing apparatus such as a digital VCR (Video Cassette Recorder) or a digital VDR (Video Disc Recorder).

Since such a digital video recording and reproducing apparatus has a relatively large record capacity, a plurality of programs may be recorded on one record medium. In this case, the top picture of each program recorded on the disc is reduced and arranged along with program information (text information). When a program has been compressed corresponding to MPEG system, an I (intra-frame encoded) picture is used as an index picture. When the sizes of picture frames of the individual programs are different, the above-descried size converting process is performed so that the sizes of the index pictures to be displayed become the same. In this case, when necessary, a filtering process is performed.

In the example shown in FIG. 12, index pictures of five programs 121a to 121e are displayed on one screen. On the screen, when the user moves a cursor as a highlighted area, he or she can select his or her desired program. Thereafter, the user presses the enter key. Thus, the program selecting operation is completed. When the enter key is pressed, the digital video recording and reproducing apparatus performs a reproducing operation for the designated program. When six or more programs are recorded, with the scrolling operation, the user can cause the apparatus to display jacket pictures and text information of the sixth and later programs.

Figure 13:
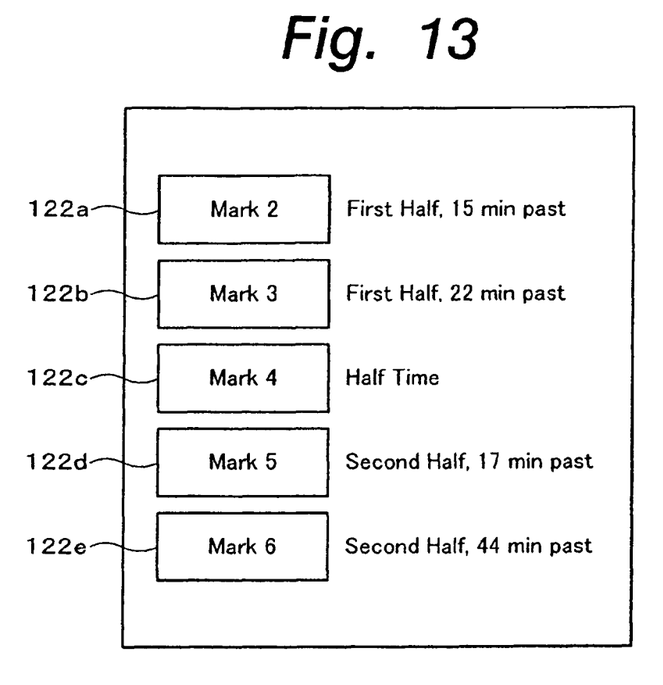
FIG. 13 is a schematic diagram showing a screen for displaying pictures marked by the user in a recorded program and comments related thereto according to the present invention.

FIG. 13 shows another example of which the present invention is applied to a digital video recording and reproducing apparatus. The user can mark a plurality of scenes of a program recorded on a disc. In addition, the user can input comments for the marked scenes.

FIG. 13 shows scenes (index pictures) 122a to 122e of a soccer game that the user has marked and comments that the user has input corresponding thereto. On such a screen, when the user moves a cursor as a highlighted area, he or she can select his or her desired index picture. After the user has selected his or her desired scene, he or she presses the enter key. Thus, the apparatus reproduces the program from the designated scene. When six or more scenes have been marked, with the scrolling operation, the user can cause the apparatus to display an index picture and a comment thereof of a sixth or later scene that has been marked.

Figure 14:
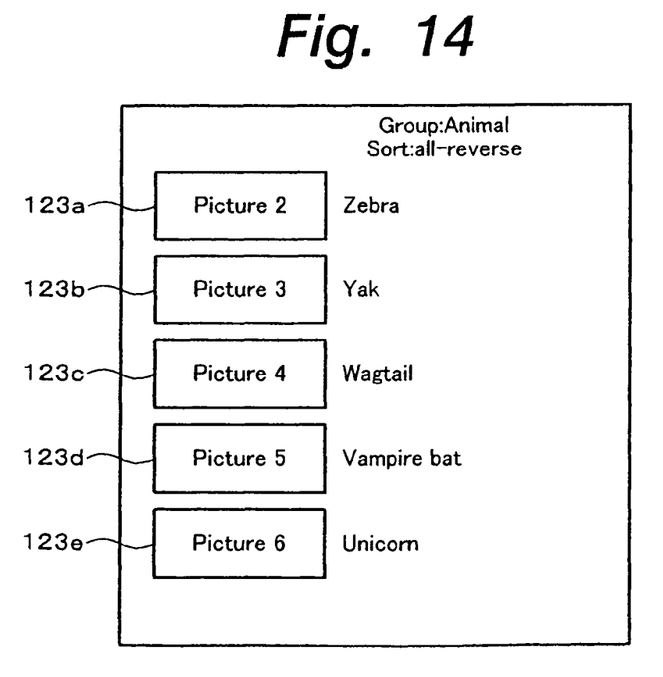
FIG. 14 is a schematic diagram showing a screen in the case that the present invention is applied to an electronic encyclopedia.

FIG. 14 shows an example of which the present invention is applied to an electronic encyclopedia. An electronic encyclopedia is accomplished with still picture data and text data recorded on a medium in such a manner that the still picture data and the text data are correlated. Alternatively, an electronic encyclopedia may be accomplished with still picture data and text data that are read through a network.

Still picture data and text data of an electronic encyclopedia are displayed as shown in FIG. 14. The order of entries of still picture data and text data may be decided corresponding to a combination of a grouping process, a sorting process, and the like. When necessary, the size converting process, the filtering process, and so forth are preformed. In the example shown in FIG. 14, five still pictures 123a to 123e and text data corresponding thereto (in FIG. 14, for simplicity, only names of animals) are simultaneously displayed. On such a screen, when the user moves a cursor as a highlighted area, he or she can select his or her desired still picture. Thereafter, when the user presses the enter key, he or she causes the apparatus to enlarge and display the selected still picture. At this point, when necessary, text data may be overlaid with a still picture. When the desired still picture is a sixth or later still picture, the user can perform a scrolling operation so as to cause the apparatus to display the desired still picture.

According to the above-described invention, a plurality of still pictures can be arranged and simultaneously displayed on a screen. Thus, when the present invention is applied to a disc changer, picture information such as jacket pictures can be provided to the user with the GUI. Thus, the visibility of information of many discs accommodated in the disc changer can be remarkably improved.

In addition, according to the present invention, while a plurality of still pictures are being simultaneously displayed, a new still picture can be added or any number of pictures can be removed from a plurality of pictures displayed on the screen without a deterioration of the picture quality. In addition, the positions of a plurality of still pictures that are simultaneously displayed on the screen can be immediately moved without a deterioration of the picture quality.

Moreover, when the picture frame sizes of still pictures to be displayed are different, they can be converted to those of the same size and then displayed. Thus, processes for displaying still pictures can be uniformly performed.

The present invention is not limited to the above-described examples. In other words, still picture data may be compressed corresponding to another encoding system such as JPEG (Joint Photographic Experts Group) system or GIF (Graphics Interchange Format) system rather than MPEG system. In addition, jacket pictures may be arranged in the horizontal direction rather than the vertical direction.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A displaying method for displaying one or more index pictures corresponding to contents data recorded on a plurality of recording media sources mounted on a reproducing apparatus, the displaying method comprising:

retrieving the contents from said plurality of recording media sources;

generating the index pictures from the retrieved contents, wherein, when sizes of said index pictures are different, a size of each of said index pictures is converted to a common picture frame size for simultaneous display on one screen;

displaying said index pictures and a text description of contents, wherein the index picture corresponding to an audio disc is jacket picture data, wherein an index picture corresponding to a video disc is a scene from a video content recorded on the video disc, wherein said index pictures are displayed in an index data region, media types of the retrieved contents are displayed in a media type selection region, and recording media sources of the retrieved contents are displayed in a recording media sources selection region, the media type selection region and the recording media sources selection region belong to a selection region, wherein when a media type in the media type selection region is selected, all the index pictures and text description of retrieved contents of the selected media type are displayed, wherein when a recording media source in the recording media sources selection region is selected, all the index pictures and text description of contents retrieved from the selected recording media source are displayed, wherein an all-folder button for browsing index pictures of contents retrieved of all recording media types is included in the selection region, and wherein when the all-folder button in the media type selection region is selected, index pictures and text description of retrieved contents of all recording media types from all recording media sources are displayed together.

2. The displaying method of claim 1, wherein said text description includes at least a title data.

3. The displaying method of claim 2, wherein said index pictures are generated from a picture frame of the contents data recorded on said plurality of recording media sources.

4. The displaying method of claim 3, wherein said index pictures are generated so that pictures of different sizes are converted into pictures of same frame size.

5. The displaying method of claim 4, wherein at least one index picture is arranged in one direction on a display device.

6. A reproducing apparatus, including a hardware element, for receiving contents data from a plurality of recording media sources mounted on the reproducing apparatus, the reproducing apparatus comprising:

index picture generating means for retrieving content data from each recording medium of said plurality of recording media sources and generating index pictures from the retrieved content data, wherein, when sizes of said index pictures are different, a size of each of said index pictures is converted to a common picture frame size for simultaneous display on one screen;

displaying means for displaying said index pictures and a text description of contents, wherein the index picture corresponding to an audio disc is jacket picture data, wherein an index picture corresponding to a video disc is a scene from a video content recorded on the video disc, wherein said index pictures are displayed in an index data region, media types of the retrieved contents are displayed in a media type selection region, and recording media sources of the retrieved contents are displayed in a recording media sources selection region, the media type selection region and the recording media sources selection region belong to a selection region, wherein when a media type in the media type selection region is selected, all the index pictures and text description of retrieved contents of the selected media type are displayed, wherein when a recording media source in the recording media sources selection region is selected, all the index pictures and text description of contents retrieved from the selected recording media source are displayed, wherein when a media related information item from said plurality of media related information items is selected, index pictures corresponding to the selected media related information item is displayed, wherein an all-folder button for browsing index pictures of contents retrieved of all recording media types is included in the selection region, and wherein when the all-folder button in the media type selection region is selected, index pictures and text description of retrieved contents of all recording media types from all recording media sources are displayed together.

7. The reproducing apparatus of claim 6, wherein said text description includes at least a title data.

8. The reproducing apparatus of claim 7, wherein said index picture generating means generates an index picture from a picture frame of the contents data recorded on said plurality of recording media sources mounted on a reproducing apparatus.

9. The reproducing apparatus of claim 8, wherein said index picture generating means generates said index picture so that pictures of different sizes are converted into pictures of same frame size.

10. The reproducing apparatus of claim 9, wherein at least one index picture generated by said index picture generating means is arranged in one direction on a display device.

11. A graphical user interface accessible to a user suitable for receiving user-supplied inputs that facilitate receipt of contents data from a plurality of recording media sources, utilizing a processor, mounted on said reproducing apparatus, comprising:
an index picture data generator for retrieving content data from plurality of recording media sources of said plurality of recording media based on said user-supplied inputs and generating index pictures from the content data,
wherein, when sizes of said index pictures are different, a size of each of said index pictures is converted to a common picture frame size for simultaneous display on one screen;
a display driver to display said index pictures and a text description of contents,
wherein the index picture corresponding to an audio disc is jacket picture data,
wherein an index picture corresponding to a video disc is a scene from a video content recorded on the video disc,
wherein said index pictures are displayed in an index data region, media types of the retrieved contents are displayed in a media type selection region, and recording media sources of the retrieved contents are displayed in a recording media sources selection region, the media type selection region and the recording media sources selection region belong to a selection region,
wherein when a media type in the media type selection region is selected, all the index pictures and text description of retrieved contents of the selected media type are displayed,
wherein when a recording media source in the recording media sources selection region is selected, all the index pictures and text description of contents retrieved from the selected recording media source are displayed,
wherein an all-folder button for browsing index pictures of contents retrieved of all recording media types is included in the selection region, and
wherein when the all-folder button in the media type selection region is selected, index pictures and text description of retrieved contents of all recording media types from all recording media sources are displayed together.

12. The graphical user interface of claim 11, wherein text description include at least a title data.

13. The graphical user interface of claim 12, wherein said index picture data generator generates said one or more index pictures from a picture frame of the contents data recorded on said plurality of recording media sources.

14. The graphical user interface of claim 13, wherein said index picture data generator generates said one or more index pictures so that pictures of different sizes are converted into pictures of same frame size.

15. The graphical user interface of claim 14, wherein at least one index picture generated by said index picture data generator is arranged in one direction on a display device by said display driver.

16. A displaying method for displaying one or more index pictures corresponding to content data recorded on a plurality of recording media sources of different types mounted on a reproducing apparatus, the displaying method comprising:
retrieving the content from said plurality of recording media sources;
generating the index pictures from the retrieved content;
wherein, when sizes of the said index pictures are different, a size of each of the index pictures is converted to a common picture frame size for simultaneous display on one screen;
displaying said index pictures and a text description of contents,
wherein the index picture corresponding to an audio disc is jacket picture data,
wherein an index picture corresponding to a video disc is a scene from a video content recorded on the video disc.

* * * * *